US009600970B2

(12) United States Patent
Meyer

(10) Patent No.: US 9,600,970 B2
(45) Date of Patent: Mar. 21, 2017

(54) ELECTRONIC GAMING MACHINE AND GAMING METHOD

(71) Applicant: AINSWORTH GAME TECHNOLOGY LIMITED, Newington, NSW (AU)

(72) Inventor: Jason Meyer, Abbotsford (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 219 days.

(21) Appl. No.: 14/330,143

(22) Filed: Jul. 14, 2014

(65) Prior Publication Data

US 2015/0018070 A1 Jan. 15, 2015

(30) Foreign Application Priority Data

Jul. 15, 2013 (AU) ................................ 2013902611

(51) Int. Cl.

*G06F 17/00* (2006.01)
*G07F 17/32* (2006.01)
*G07F 17/34* (2006.01)

(52) U.S. Cl.

CPC ........ *G07F 17/3267* (2013.01); *G07F 17/326* (2013.01); *G07F 17/34* (2013.01)

(58) Field of Classification Search

None

See application file for complete search history.

(56) References Cited

U.S. PATENT DOCUMENTS

| | | | |
|---|---|---|---|
| 4,198,052 | A | 4/1980 | Gauselmann |
| 4,240,635 | A | 12/1980 | Brown |
| 5,364,100 | A | 11/1994 | Ludlow et al. |
| 5,722,891 | A | 3/1998 | Inoue |
| 5,775,692 | A | 7/1998 | Watts et al. |
| 5,823,873 | A | 10/1998 | Moody |
| 5,833,537 | A | 11/1998 | Barrie |
| 5,848,932 | A | 12/1998 | Adams |
| 5,868,619 | A | 2/1999 | Wood |
| 5,919,088 | A | 7/1999 | Weiss |
| 5,997,401 | A | 12/1999 | Crawford |
| 6,062,980 | A | 5/2000 | Luciano |
| 6,089,977 | A | 7/2000 | Bennett |
| 6,117,009 | A | 9/2000 | Yoseloff |
| 6,120,031 | A | 9/2000 | Adams |

(Continued)

FOREIGN PATENT DOCUMENTS

| | | |
|---|---|---|
| AU | 722902 | 6/1998 |
| EP | 0950998 | 10/1999 |

(Continued)

*Primary Examiner* — Paul A D'Agostino

(74) *Attorney, Agent, or Firm* — Cook Alex Ltd.

(57) ABSTRACT

An electronic gaming machine includes a display for displaying a game including game symbols arranged into an array of predetermined game positions. An electronic game controller designates at least one of the predetermined game positions as a special game position in the array such that a special symbol appearing in the special game position in a play of the game causes the electronic game controller to award a game enhancing element to the player. The special game position is visually indicated on the array to the player during the play by a graphical element associated with the special game position. A gaming method is also provided.

35 Claims, 10 Drawing Sheets

(56) References Cited

U.S. PATENT DOCUMENTS

| | | | | |
|---|---|---|---|---|
| 6,120,378 | A | 9/2000 | Moody et al. | |
| 6,155,925 | A | 12/2000 | Giobbi et al. | |
| 6,159,095 | A | 12/2000 | Frohm et al. | |
| 6,159,098 | A | 12/2000 | Slomiany | |
| 6,190,255 | B1 | 2/2001 | Thomas et al. | |
| 6,224,482 | B1 | 5/2001 | Bennett | |
| 6,227,971 | B1 | 5/2001 | Weiss | |
| 6,241,607 | B1 | 6/2001 | Payne et al. | |
| 6,254,481 | B1 | 7/2001 | Jaffe | |
| 6,312,334 | B1 | 11/2001 | Yoseloff | |
| 6,322,445 | B1 | 11/2001 | Miller | |
| 6,379,245 | B2 | 4/2002 | De Keller | |
| 6,413,161 | B1 | 7/2002 | Baerlocher et al. | |
| 6,443,837 | B1 | 9/2002 | Jaffe | |
| 6,454,649 | B1 | 9/2002 | Mattice et al. | |
| 6,544,120 | B2 | 4/2003 | Ainsworth | |
| 6,558,253 | B1 | 5/2003 | DeSimone et al. | |
| 6,612,574 | B1 | 9/2003 | Cole et al. | |
| 6,656,040 | B1 | 12/2003 | Brosnan et al. | |
| 6,656,046 | B1 | 12/2003 | Yoseloff | |
| 6,921,335 | B2 | 7/2005 | Rodgers et al. | |
| 6,935,947 | B1 | 8/2005 | Singer et al. | |
| 7,070,503 | B2 | 7/2006 | Rudolph | |
| 7,553,231 | B2 | 6/2009 | Rodgers et al. | |
| 7,666,085 | B2 | 2/2010 | Vorias et al. | |
| 7,695,365 | B2 | 4/2010 | Casey | |
| 7,762,882 | B2 | 7/2010 | Okada | |
| 8,012,013 | B2 | 9/2011 | Walker et al. | |
| 8,137,179 | B2 | 3/2012 | Jensen et al. | |
| 8,231,452 | B2 * | 7/2012 | Suda | G07F 17/3267 463/17 |
| 8,292,724 | B2 * | 10/2012 | Marks | G07F 17/3227 463/16 |
| 8,292,739 | B2 | 10/2012 | Iverson et al. | |
| 8,298,073 | B2 | 10/2012 | Bryant | |
| 8,419,519 | B2 * | 4/2013 | Aoki | 463/16 |
| 9,196,131 | B2 | 11/2015 | Meyer | |
| 9,218,719 | B2 | 12/2015 | Meyer | |
| 9,418,506 | B2 | 8/2016 | Meyer | |
| 2001/0048193 | A1 | 12/2001 | Yoseloff | |
| 2001/0053712 | A1 | 12/2001 | Yoseloff | |
| 2002/0010018 | A1 | 1/2002 | Lemay et al. | |
| 2002/0052233 | A1 | 5/2002 | Gauselmann | |
| 2003/0060276 | A1 | 3/2003 | Walker et al. | |
| 2004/0048646 | A1 | 3/2004 | Visocnik | |
| 2005/0070354 | A1 | 3/2005 | Baerlocher et al. | |
| 2005/0288090 | A1 * | 12/2005 | Thomas | G07F 17/34 463/20 |
| 2006/0058095 | A1 | 3/2006 | Berman et al. | |
| 2006/0189380 | A1 | 8/2006 | Schultz et al. | |
| 2008/0108411 | A1 | 5/2008 | Jensen et al. | |
| 2008/0167113 | A1 | 7/2008 | Plowman | |
| 2008/0167115 | A1 * | 7/2008 | Singer | G07F 17/3286 463/20 |
| 2009/0075722 | A1 | 3/2009 | Louie et al. | |
| 2009/0227351 | A1 * | 9/2009 | Yoshizawa | G07F 17/34 463/20 |
| 2010/0216540 | A1 * | 8/2010 | Berman | G07F 17/32 463/20 |
| 2010/0298042 | A1 | 11/2010 | Berman et al. | |
| 2012/0122546 | A1 | 5/2012 | Lange et al. | |
| 2012/0258785 | A1 | 10/2012 | Suda | |
| 2013/0017881 | A1 | 1/2013 | Watkins | |
| 2013/0344939 | A1 * | 12/2013 | Aoki | G07F 17/326 463/21 |
| 2014/0038690 | A1 | 2/2014 | Meyer | |
| 2014/0045572 | A1 * | 2/2014 | Li | G07F 17/34 463/20 |
| 2014/0066170 | A1 * | 3/2014 | Aoki | G07F 17/34 463/20 |
| 2014/0148243 | A1 | 5/2014 | Meyer | |
| 2014/0179398 | A1 * | 6/2014 | Vandaele | G07F 17/34 463/20 |
| 2015/0057068 | A1 * | 2/2015 | Burghard | G07F 17/3213 463/20 |

FOREIGN PATENT DOCUMENTS

| | | |
|---|---|---|
| GB | 1444085 | 7/1976 |
| GB | 2130413 | 5/1984 |
| GB | 2292245 | 2/1996 |
| GB | 1464896 | 2/1997 |
| GB | 2327794 | 2/1999 |
| WO | WO 97/27569 | 7/1997 |
| WO | WO 98/07124 | 2/1998 |
| WO | WO 00/08613 | 2/2000 |

* cited by examiner

ELECTRONIC GAMING MACHINE AND GAMING METHOD

BACKGROUND

The present invention relates to an electronic gaming machine and in a particular an electronic gaming machine having a base game and a feature game. The invention has been developed primarily for use as an electronic gaming machine and will be described hereinafter by reference to this application.

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Conventional gaming machines typically involve awarding prizes to a player according to predetermined combinations of game symbols that appear on an array of game squares displayed on a screen, typically organised into three rows and five columns (a 5×3 array). Other arrays, such as a 3×3 or 4×3, may be used. Each gaming machine randomly selects the game symbols that appear on the array, each column of the array being a “reel”.

In an electronic gaming machine, the mechanical reels are replaced with video images of the reels, which are displayed on a video display screen. The electronic gaming machine has an internal electronic game controller, typically a computer, computational processor or other central processing unit, that controls the display of images on the video display screen so that the reels are visibly spun on the screen to simulate a physical reel of a traditional gaming machine. Electronic gaming machines are also more versatile in presenting game information, varying the probabilities for a player to win a prize and varying the type of game that is played.

One type of electronic gaming machine offers multiple sets of reels to permit a player to play several reels at the same time, depending on the amount that is wagered or bet by the player. For example, a gaming machine could offer four reel sets each having 50 pay lines available for selection by the player. By wagering a suitable amount, such as 200 credits, the player can play all 50 pay lines and thus all four reel sets.

Bonus or “feature” games may also be provided by an electronic gaming machine in addition to a base or main game. Typically feature games use the same set of reels as the main game and are limited to a set of free games operated under a single set of rules. This means that the feature game is restricted by the same set of rules, and so there is no variation in the play of the feature game. Consequently, it is difficult to retain player interest because there is no apparent incentive for the player to continue playing the same electronic gaming machine once the player becomes familiar with the feature game and the main game. Also, it is difficult to retain player interest since there is little differentiation between gaming machines in terms of the main and feature games that are played.

It is an object of the present invention to overcome or substantially ameliorate one or more of the disadvantages of prior art, or at least to provide a useful alternative.

It is an object of the invention in at least one preferred form to provide an electronic gaming machine and a gaming method for an electronic gaming machine that encourages player interest.

SUMMARY

According to a first aspect of the invention, there is provided an electronic gaming machine comprising:

a display for displaying a game, wherein said game comprises game symbols arranged into an array of predetermined game positions and where predetermined winning combinations of randomly selected game symbols in said game award prizes to a player, and an electronic game controller for controlling the display of said game symbols on said display, wherein said electronic game controller designates at least one of said predetermined game positions as a special game position in said array such that a special symbol appearing in said special game position in a play of said game causes said electronic game controller to award a game enhancing element to said player, and wherein said special game position is visually indicated on said array to said player during said play by a graphical element associated with said special game position.

Unless the context clearly requires otherwise, throughout the description and the claims, the words “comprise”, “comprising”, and the like are to be construed in an inclusive sense as opposed to an exclusive or exhaustive sense; that is to say, in the sense of “including, but not limited to”.

Furthermore, as used herein and unless otherwise specified, the use of the ordinal adjectives “first”, “second”, “third”, etc., to describe a common object, merely indicate that different instances of like objects are being referred to, and are not intended to imply that the objects so described must be in a given sequence, either temporally, spatially, in ranking, or in any other manner.

According to a second aspect of the invention, there is provided an electronic gaming machine comprising:

a display for displaying a game, wherein said game comprises game symbols arranged into an array of predetermined game positions and where predetermined winning combinations of randomly selected game symbols in said game award prizes to a player, and an electronic game controller for controlling the display of said game symbols on said display, wherein said electronic game controller designates at least one of said predetermined game positions as a special game position in said array, said game symbols being displayable in said special game position, wherein said special game position is visually indicated on said array to said player during each play of said game by a graphical element associated with said special game position, and wherein a special symbol appearing in said special game position in a play of said game causes said electronic game controller to award a game enhancing element to said player.

Preferably, said graphical element comprises a graphically enhanced element.

Preferably, said graphical element comprises a highlighted boundary of said special game position.

Preferably, said graphical element comprises an animation associated with said special game position. More preferably, said animation comprises an animation of said special game position or said boundary.

Preferably, said graphical element comprises an animation of said special symbol appearing in said special game position.

Preferably, said graphical element is displayed on said display at all times on said electronic gaming machine. Alternatively, said graphical element is displayed from the start of a play of said game until the end of said play. That is, the graphical element is only displayed once the special game position is designated at the start of said play prior to the reels being spun, or at least before the reels have displayed any game symbols for the result of the play of the game and remains in position until the end of said play when all reels have completed spinning and the associated results of the play of the game are known to the player.

Preferably, said graphical element comprises an area within said array associated with said special game position. More preferably said associated area changes in response to said special symbol appearing in said special game position.

Preferably, said game enhancing element comprises at least one or more of a predetermined number of free games, a win multiplier, wild multipliers, bonus wilds, symbols that cause the award of additional free games, trigger symbols to retrigger said at least two second arrays, held columns, random wild symbols, stacked symbols, bonus symbols, new game symbols, reveal symbols, progressives, bonus credits, jackpot symbols, and one or more symbol replacements.

Preferably, said game enhancing element comprises the designation of a group of predetermined game positions on said array as resultant game positions such that game symbols appearing in said resultant game positions change into at least one other game symbol. More preferably, said game symbols change into a substitute symbol. In one preferred form, said array comprises rows and columns of predetermined game positions and said resultant game positions comprise the predetermined game positions in the same column as said special game position. Alternatively or additionally, said resultant game positions comprise the predetermined game positions in at least one column adjacent to the column containing said special game position. In a particularly preferred example of this alternative or additional form, said resultant game positions comprise the predetermined game positions in each column adjacent to and on either side of the column containing said special game position.

Preferably, said electronic game controller designates a different predetermined game position as said special game position between two plays of said game. More preferably, said two plays are successive plays of said game. In an alternative form, said two plays are the first and last plays of a predetermined number of plays of said game.

Preferably, there is a plurality of special game positions on said array. More preferably, said array comprises rows and columns of predetermined game positions and at least one of said columns comprises only said special game positions. In one preferred form, said special game positions are respectively associated with different game enhancing elements.

Where said game enhancing element comprises the designation of a group of predetermined game positions on said array as resultant game positions such that game symbols appearing in said resultant game positions change into at least one other game symbol, it is preferred that different groups of predetermined game positions can be designated as resultant game positions. In one preferred form, there is a plurality of said special game positions and each of said special game positions are respectively associated with said different groups. In another preferred form, said at least one of said special game positions is associated with one of said groups in a base game and is associated with another of said groups in a feature game.

Preferably, the game comprises a base game and a feature game. More preferably, at least one special game position is available for play in only said base game, only said feature game or both said base game and said feature game.

Preferably, said base game and said feature game each comprises an array of rows and columns of said predetermined game positions, and said base game array is different in size and/or dimensions to said feature game array. More preferably, said feature game array is greater in size than said base game array. In one preferred form, said base array comprises three rows and five columns and said feature game array comprises either more than three rows or more than five columns. In a further preferred form, said feature game array is an extended base game array.

More preferably, said electronic game controller designates a different predetermined game position as said special game position between a play of said base game and a play of said feature game.

Preferably, a feature game trigger event occurs in said base game to trigger said feature game. In one preferred form, said feature game trigger event comprises a random event determined by said electronic game controller at the start of play of said feature game. In another preferred form, the feature game trigger event comprises the appearance of at least one trigger symbol in said base game array. In another alternative, the feature game trigger event comprises an in-game event during play of the base game.

Preferably, said one or more game enhancing elements modify the result of a play of said game.

Preferably, said array (including the base game array and/or the feature game array) take any one of a circular, triangular, oval, semi-circular, hexagonal, pentagonal, octagonal, non-rectangular or polygonal shape. In one preferred form, said wheels and said enhanced wheels arrays take the form of partially shown circular wheels.

Preferably, the player selectively starts and/or stops play of said base game array and/or said feature game array.

Preferably, the electronic gaming machine comprises a mobile electronic gaming device. More preferably, said mobile electronic gaming device comprises a handheld electronic device. In one preferred form, said handheld electronic device comprises a handheld electronic gaming device or a smart phone. Alternatively, said electronic gaming machine comprises a computer. More preferably, said computer is connected to a communication network.

According to a third aspect of the invention, there is provided a gaming method for an electronic gaming machine comprising a display and an electronic game controller, comprising:

controllably displaying game symbols on said display to play a game wherein predetermined winning combinations of randomly selected game symbols in said game award prizes to a player;

arranging said game symbols into an array of predetermined game positions;

designating said electronic game controller designates at least one of said predetermined game positions as a special game position in said array;

associating a graphical element with each said special game position to visually indicate each said special game position to said player, and awarding a game enhancing element in response to the appearance of a special symbol in said special game position in a play of said game.

According to a fourth aspect of the invention, there is provided a gaming method for an electronic gaming machine comprising a display and an electronic game controller, comprising:

controllably displaying game symbols on said display to play a game wherein predetermined winning combinations of randomly selected game symbols in said game award prizes to a player;

arranging said game symbols into an array of predetermined game positions;

designating said electronic game controller designates at least one of said predetermined game positions as a special game position in said array, wherein said game symbols are displayable in said special game position;

associating a graphical element with each said special game position to visually indicate each said special game position to said player during each play of said game, and awarding a game enhancing element in response to the appearance of a special symbol in said special game position in a play of said game.

Preferably, said associating step further comprises graphically enhancing the visual appearance of said special game position.

Preferably, said associating step further comprises highlighting a boundary of said special game position.

Preferably, said associating step further comprises associating an animation with said special game position. More preferably, said associating step further comprises animating said special game position or said boundary.

Preferably, said method further comprises displaying said graphical element on said display at all times on said electronic gaming machine. Alternatively, said method further comprises displaying said graphical element from the start of a play of said game until the end of said play.

Preferably, said associating step further comprises changing an area within said array associated with said special game position in response to said special symbol appearing in said special game position.

Preferably, said awarding step further comprises designating a group of predetermined game positions on said array as resultant game positions and changing game symbols appearing in said resultant game positions into at least one other game symbol. More preferably, said game symbols change into a substitute symbol.

Preferably, wherein said designating step comprises designating said special game position in only a base game, only a feature game or both said base game and said feature game. More preferably, said base game and said feature game each comprises an array of rows and columns of said predetermined game positions, and said method further comprises displaying said base game array in a different size and/or dimensions to said feature game array. In one preferred form, said feature game array is greater in size than said base game array. In another preferred form, said base array comprises three rows and five columns and said feature game array comprises either more than three rows or more than five columns.

Preferably, said designating step comprises designating a different predetermined game position as said special game position between two plays of said game.

Preferably, said method further comprises providing a plurality of said special positions. More preferably, where said awarding step comprises designating a group of predetermined game positions as resultant game positions, said awarding step further comprises designating different groups of predetermined game positions as resultant game positions and respectively associating said special game positions with said different groups.

Preferably, said designating step comprises designating said special game position in only a base game, only a feature game or both said base game and said feature game. More preferably, said base game and said feature game each comprises an array of rows and columns of said predetermined game positions, further comprising displaying said base game array in a different size and/or dimensions to said feature game array. In one preferred form, said feature game array is greater in size than said base game array. In another preferred form, said base array comprises three rows and five columns and said feature game array comprises either more than three rows or more than five columns.

Preferably, said designating step comprises designating a different predetermined game position as said special game position between a play of said base game and a play of said feature game.

Preferably, where said awarding comprises the designation of a group of predetermined game positions on said array as resultant game positions such that game symbols appearing in said resultant game positions change into at least one other game symbol, said awarding step further comprises designating different groups of predetermined game positions as resultant game positions and associating at least one of said special game positions is associated with one of said different groups in said base game and is associated with another of said different groups in said feature game.

The methods of the third and fourth aspects also preferably have the preferred features of the first and second aspects of the invention stated above, where applicable.

According to a fifth aspect of the invention, there is provided a gaming system comprising a central processing unit configured for communication with an electronic gaming machine, wherein said gaming system is configured to perform the method of the third or fourth aspects of the invention on said electronic gaming machine.

According to a sixth aspect of the invention, there is provided a computer program configured to perform the method of the third or fourth aspects of the invention.

According to a seventh aspect of the invention, there is provided a non-transitory carrier medium carrying computer executable code that, when executed on a central processing unit configured for communication with an electronic gaming machine, causes the central processing unit to perform the method of the third or fourth aspects of the invention on said electronic gaming machine.

BRIEF DESCRIPTION OF THE DRAWINGS

Preferred embodiments of the invention will now be described, by way of example only, with reference to the accompanying drawings in which.

DETAILED DESCRIPTION OF THE VARIOUS EMBODIMENTS

Figure 1:
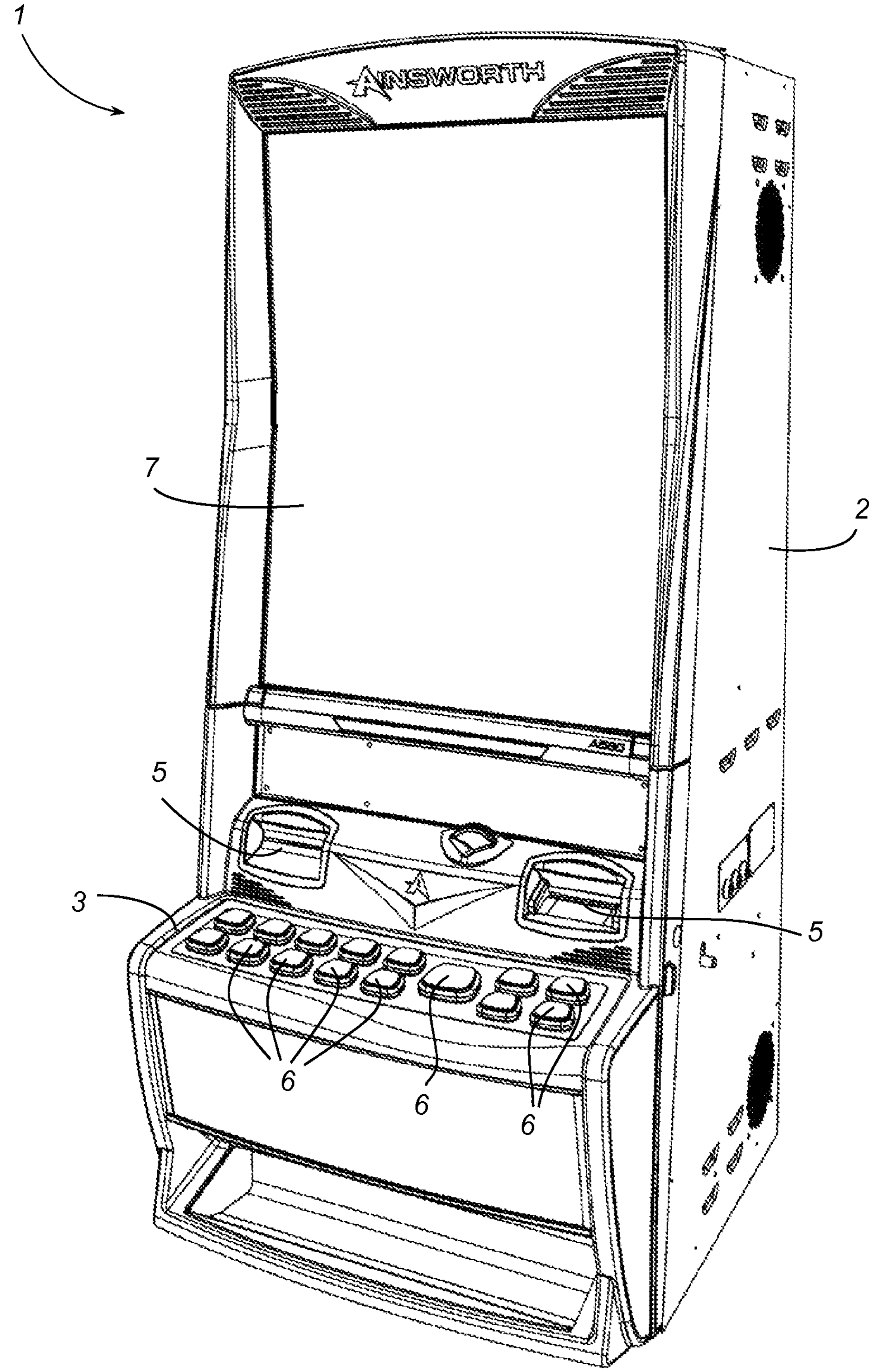
FIG. 1 is a perspective view of an electronic gaming machine according to a first embodiment of the invention.
Figure 2:
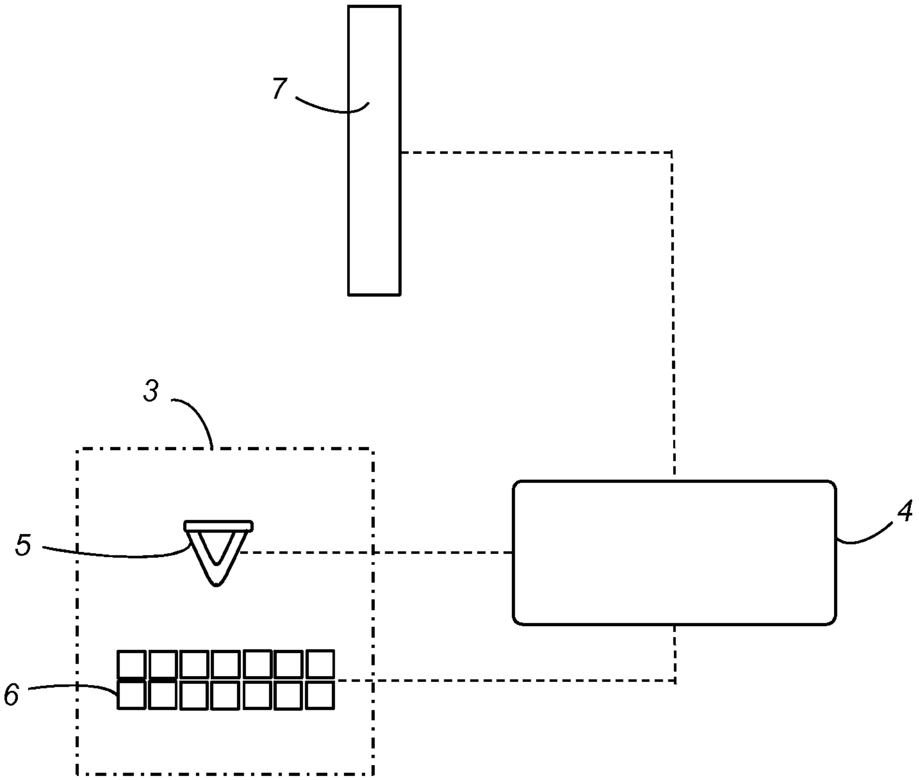
FIG. 2 is a schematic drawing of an electronic game controller for the electronic gaming machine of FIG. 1.

The present invention will now be described with reference to the following examples which should be considered in all respects as illustrative and non-restrictive. Referring to FIG. 1, an electronic gaming machine 1 according to a first embodiment of the invention includes a cabinet 2, a console 3 and an internal electronic game controller 4. The console 3 has various input devices including vending slots 5 for receiving monetary bets and a plurality of buttons 6 for actuation by a player. The electronic game controller 4 is generally in the form of a central processing unit, such as a computer, and is in electronic communication with a display 7 in the form of a video display screen, as well as various input devices on the console 3. It is also appreciated that a person skilled in the art would readily understand the location and use of the electronic game controller 4 in the electronic gaming machine 1.

Figure 3:
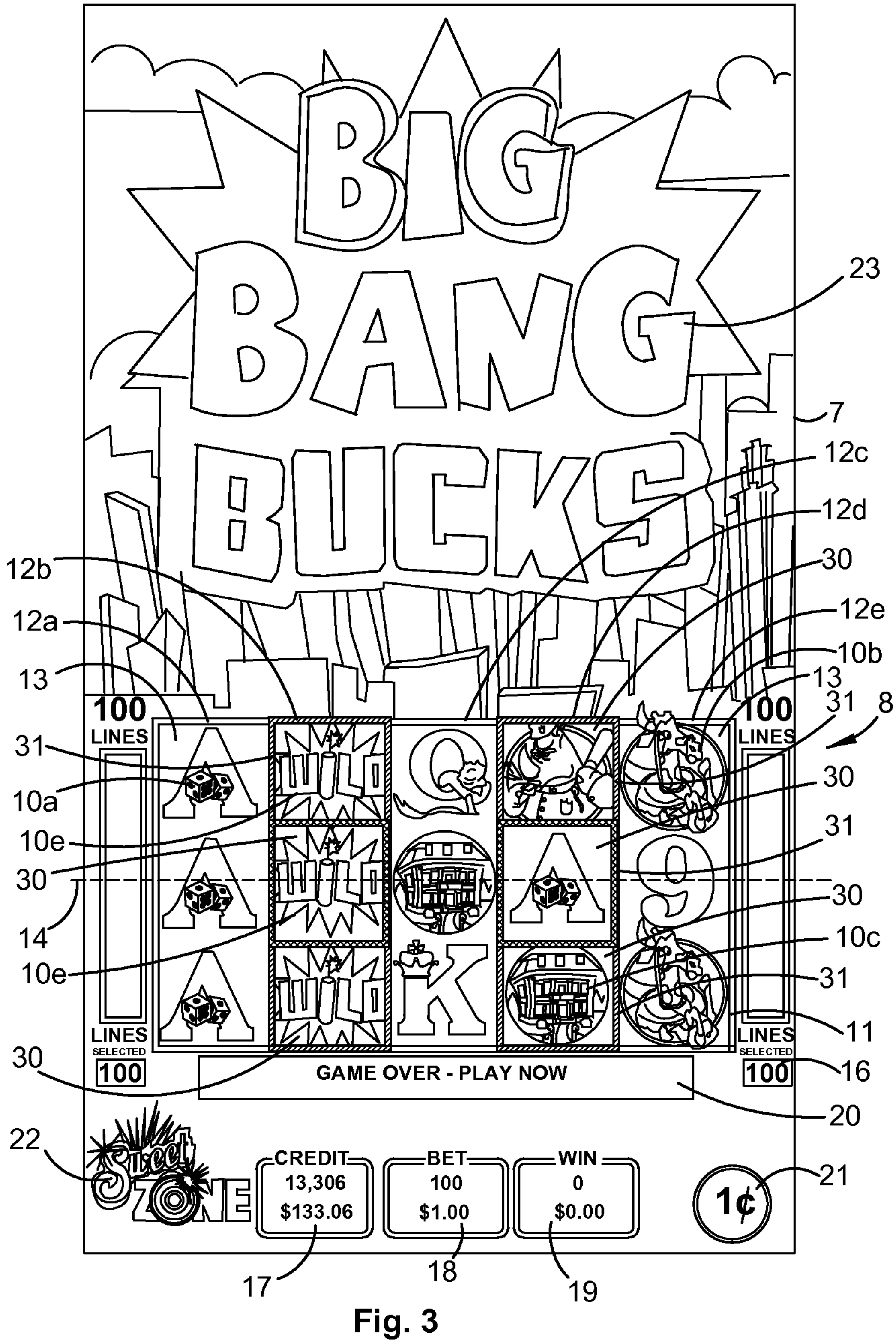
FIGS. 3 to 7 are front views of the display of the electronic gaming machine of FIG. 1 illustrating a base game.
Figure 6:
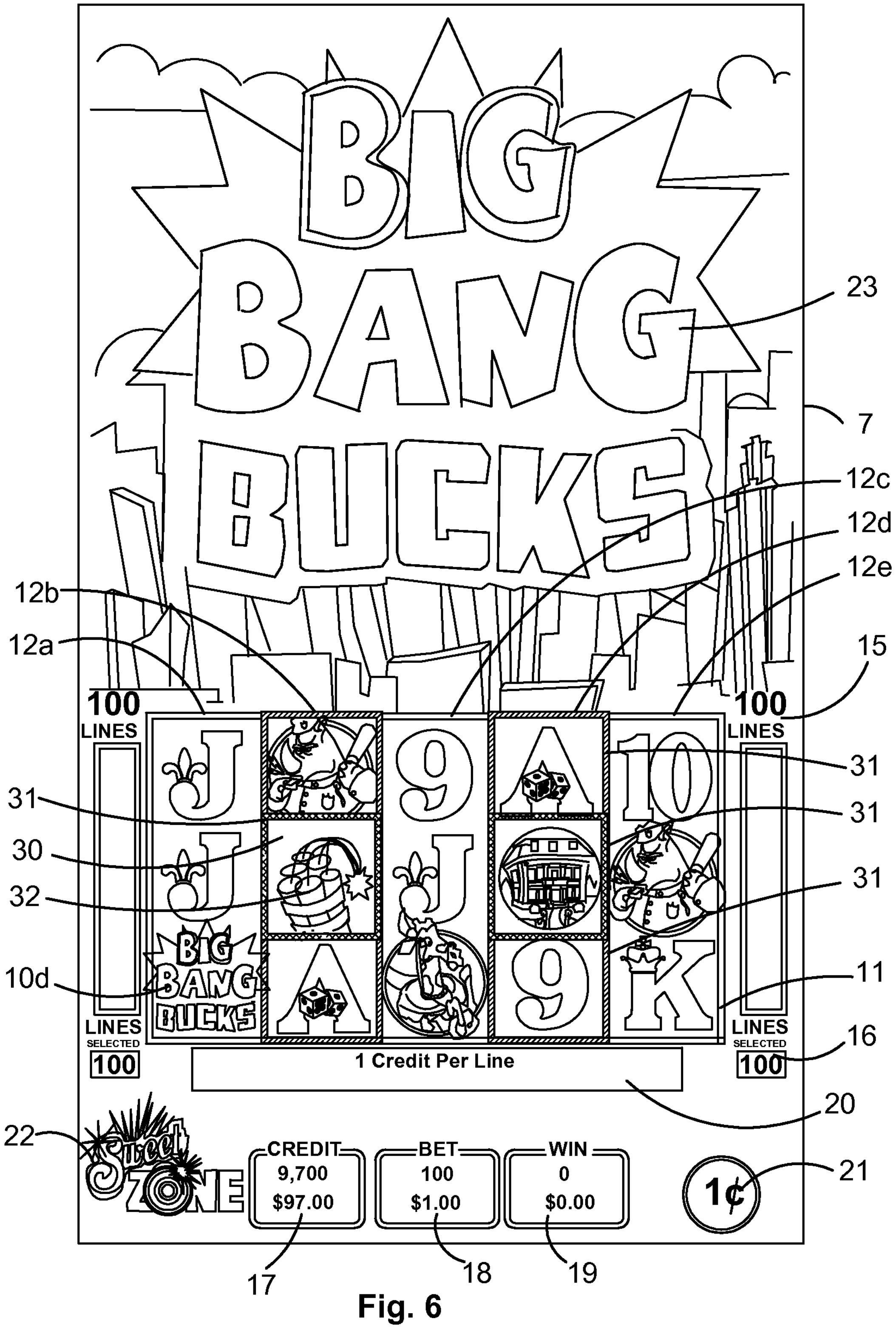
Figure 7:
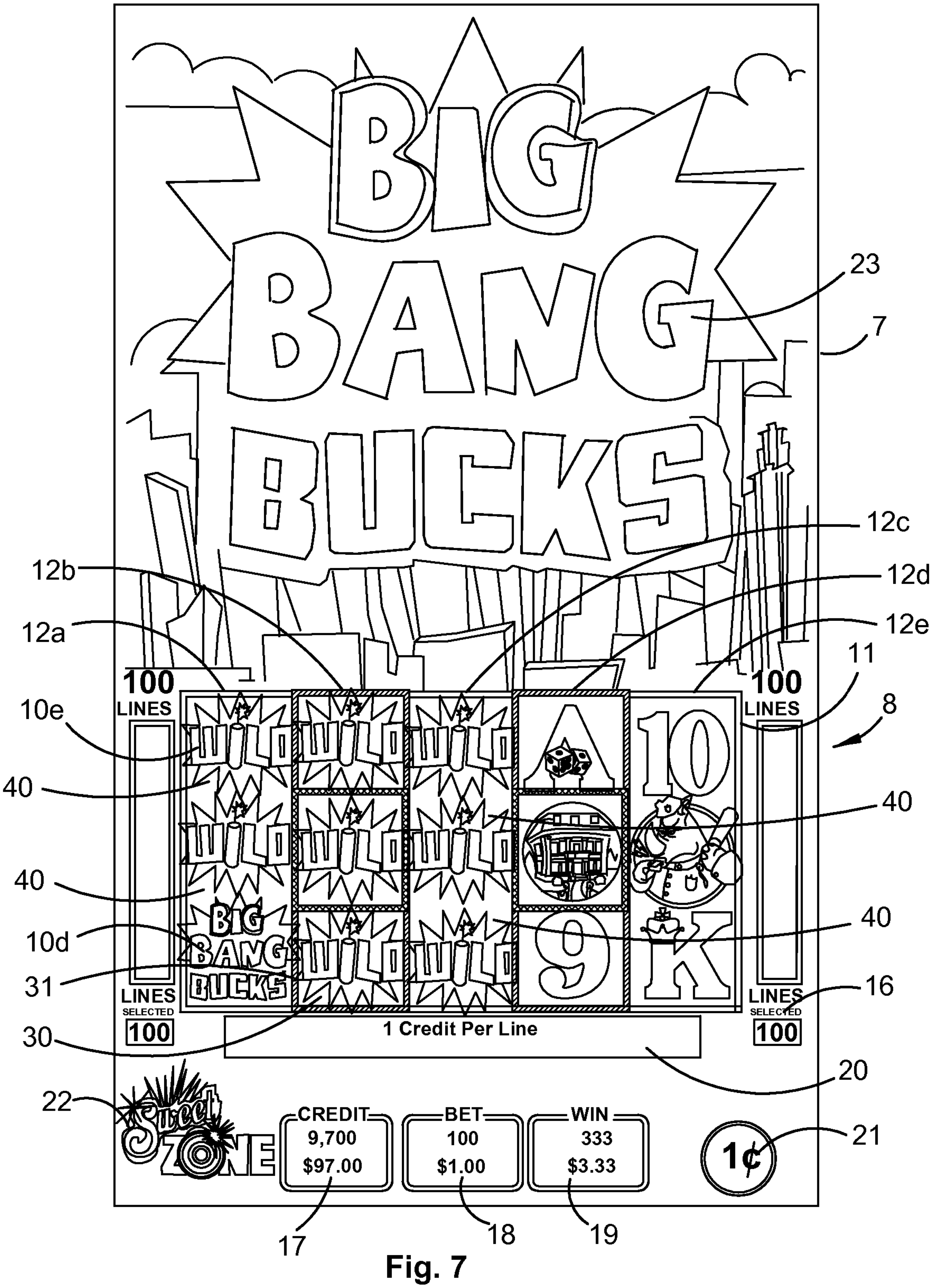
Figure 8:
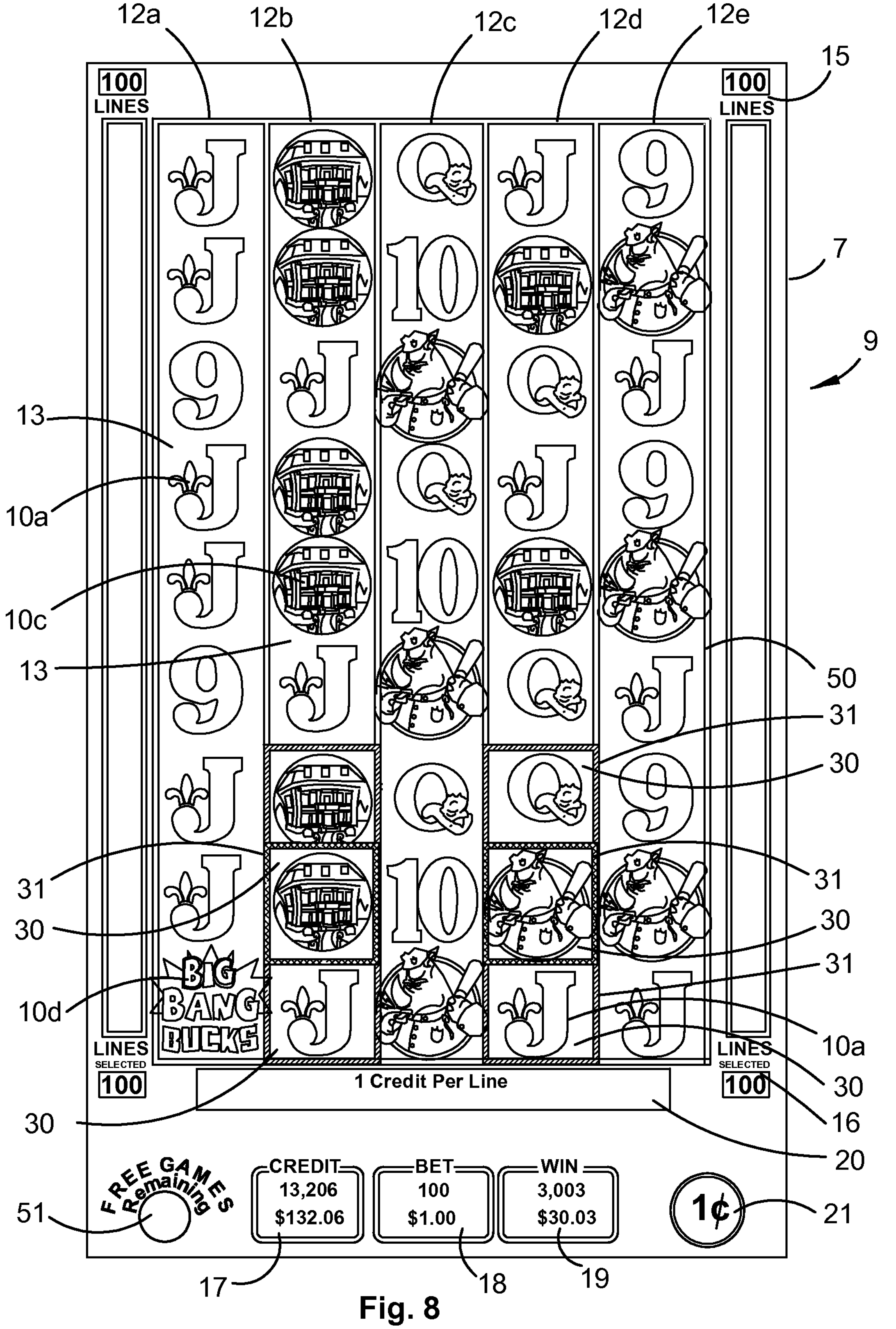
FIGS. 8 to 10 are front views of the display of the electronic gaming machine of FIG. 1 illustrating a feature game.
Figure 9:
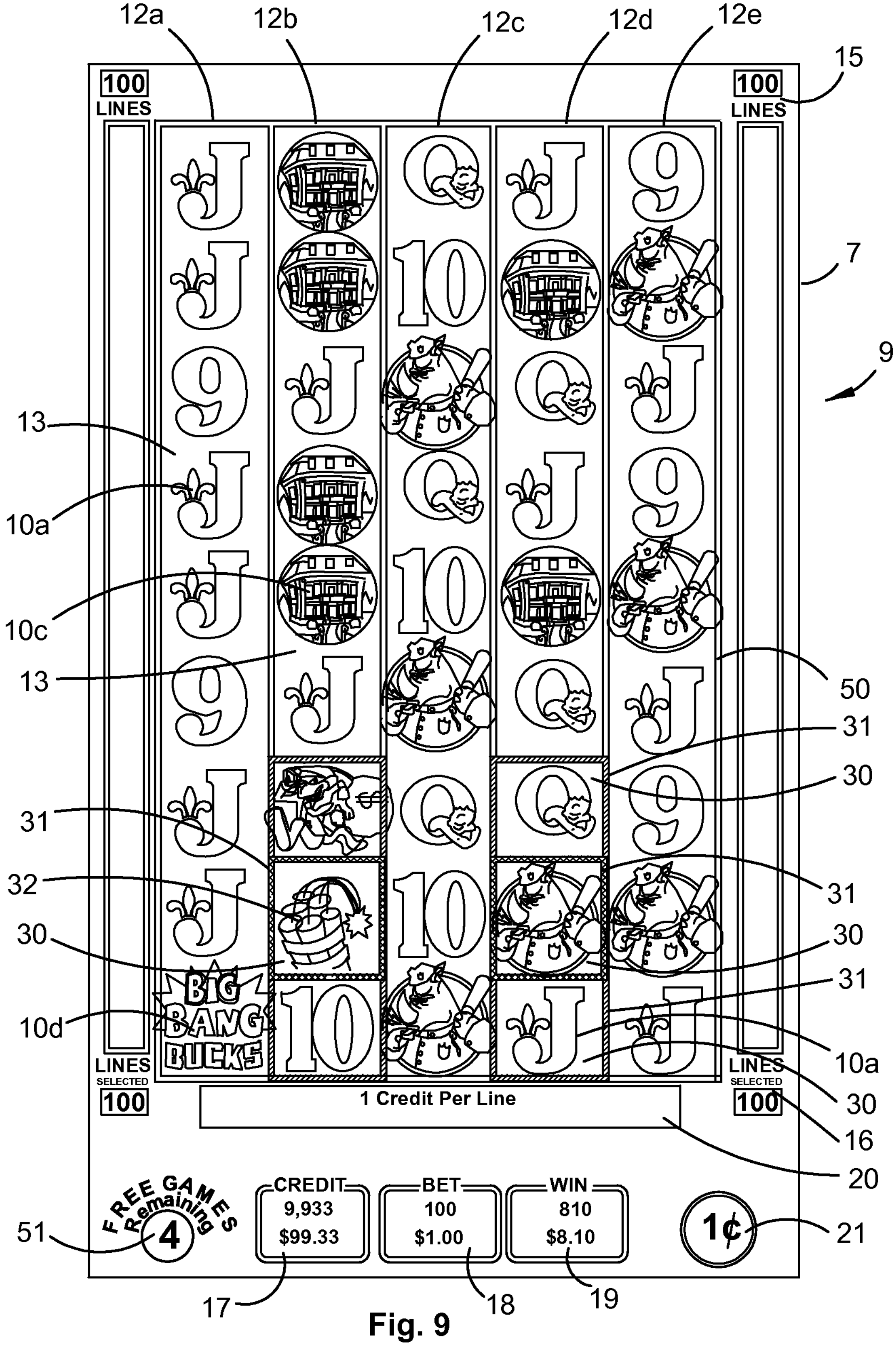
Figure 10:
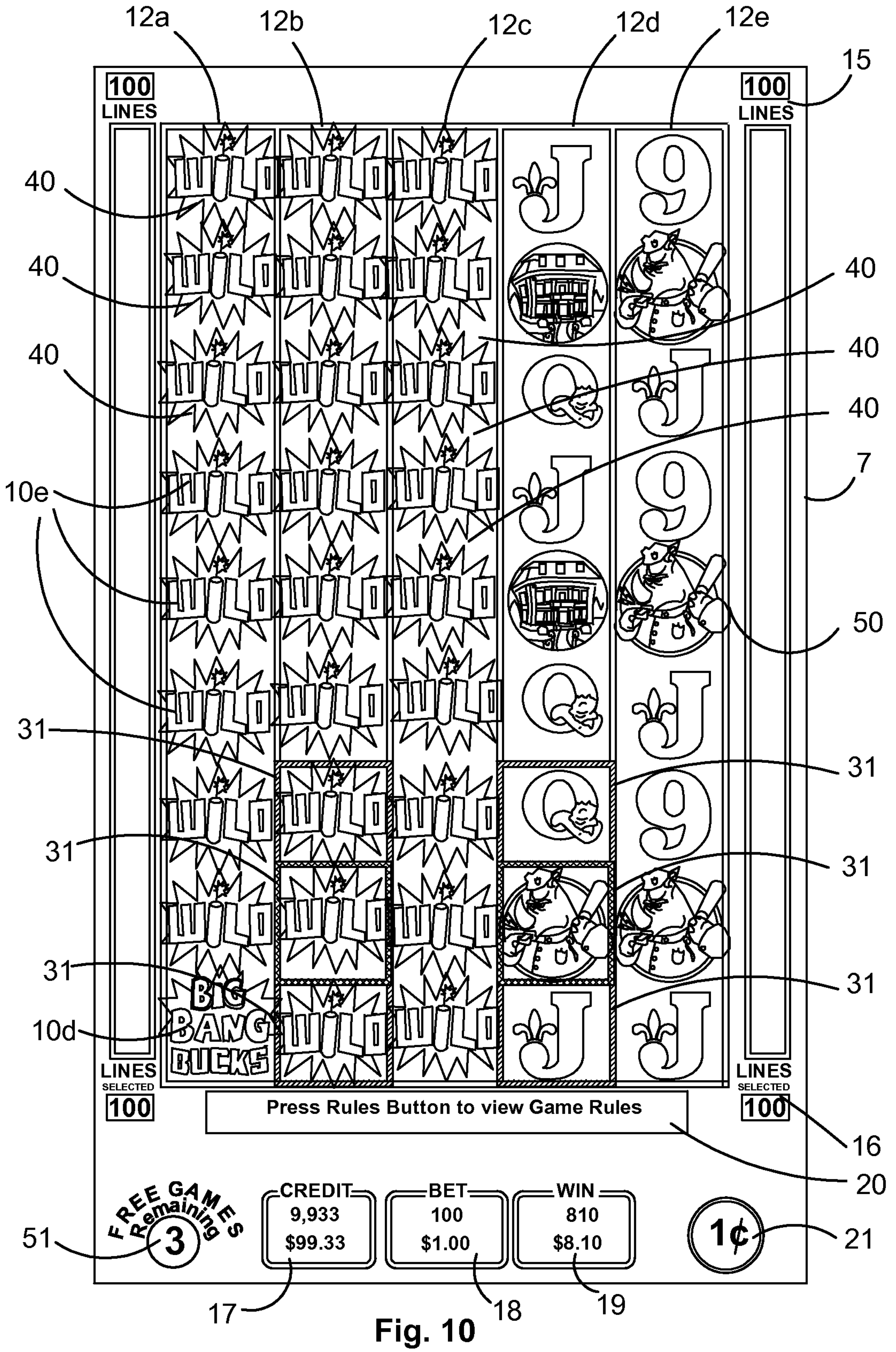

The electronic game controller 4 is programmed to provide a game in the form of a base game 8 (as best shown in FIGS. 3 to 7) and a feature game 9 (as best shown in FIGS. 8 to 10) on the electronic gaming machine 1 for play by a player. The base game 8 has game symbols 10 arranged into an array 11 in the form of five columns or "reels" 12, as best shown in FIG. 3. The reels 12 give the visual appearance of rotating, typically by having the game symbols 10 move in a downward linear path along the length of each reel 12. While the array 11 is arranged with five reels 12 and three rows, it will be appreciated by one skilled in the art that other types of arrays could be used, such as 3×3, 4×3, 5×5, 4×4, etc., including arrays having an irregular number of rows and/or columns.

The array 11 of the base game 8 defines predetermined game or symbol positions game position 13, in which the game symbols 10 appear. The symbol positions 13 are not visually marked by boundary lines and simply provide an area for the game symbols 10 to appear. However, it will be appreciated that in other embodiments, the symbol positions 13 are defined by visible boundary lines or other markings to define each respective area of the symbol positions, such as a square or game position.

The array 11 is arranged so that a player can select one or more predetermined "pay lines" 14 defined around the array, which correspond to combinations of the game positions game position 13. The pay lines 14 correspond to the lines selected by the player and generally comprise at least one game position 13 from each reel 12. The number of pay lines 14 that can be selected by the player depends on the amount of the monetary bet for playing a game on the array 11. In the base game 8, predetermined winning combinations of randomly selected game symbols 10 result in the award of prizes to the player.

The game symbols 10 can include a mixture of picture symbols (such as animal symbols or playing card symbols), word symbols, scatter symbols, substitute or wild card symbols and trigger symbols to trigger the feature game 9. Those skilled in the art will readily understand that a substitute symbol is able to act as any other game symbol, and hence is also known as a "wild card" symbol. Likewise, those skilled in the art will readily understand that a scatter symbol is a symbol that triggers a game event or confers an award without having to appear on a player-selected pay line 14. Similarly, a trigger symbol is a symbol that triggers a game event or confers an award, where the trigger symbol may or may not have to appear in combination and may or may not have to appear on the same player-selected pay line 14. In this embodiment, the game symbols 10 include playing card symbols 10*a*, animal-themed symbols 10*b*, item-themed symbols 10*c*, scatter symbols in the form of "BIG BANG BUCKS" symbols 10*d* and a substitute or wild card symbol in the form of "WILD" symbols 10*e*. The electronic game controller 4 randomly determines the appearance of the game symbols 10 on the array 11.

The video screen 7 also displays other standard game information including the number of pay lines available 15, the number of player-selected pay lines 16, the amount of player credits 17, the amount of the current bet wagered by the player 18, the amount of wins by the player 19, a message area 20, a current denomination button 21 indicating the currently selected base bet denomination and the name 22 of the brand or type of game that the base game 8 belongs to, being "Sweet Zone™". The video screen 7 displays the name 23 of the base game 8, "Big Bang Bucks™", as best shown in FIGS. 3 to 7. In other embodiments, the video screen 7 displays jackpot information relating to the based game 8 and feature game 9 that are awarded by the electronic gaming machine 1. This jackpot information can comprise, in descending order of monetary value, a grand jackpot, major jackpot, minor jackpot and midi jackpot.

The array 11 also has designated special game positions 30 that are each visually indicated to the player during play of the base game 8 by a graphical element 31. In this embodiment, there are six special game positions 30 in the base game 8 that occupy reels 12*b* and 12*d* (typically called reels 2 and 4). The graphical element 31 is graphically enhanced to ensure that the player can distinguish the special game positions 30 from the other game positions 13 in the array 11 during game play. In this embodiment, the graphical element 31 takes the form of a highlighted boundary that surrounds each special game position 30.

Each boundary 31 has a distinct colour that distinguishes the special game positions 30 from the other game positions 13 in the array 11. Generally, the top and bottom special game positions 30 of each reel 12*b*, 12*d* have a blue boundary 31 and the middle special game position 30 of each reel 12*b*, 12*d* has a red boundary 31. It is preferred that adjoining special game positions 30 alternate in colour to assist in distinguishing the special game positions from each other. Also, each boundary 31 is animated by having a flashing chaser light move along the boundary during game play to further highlight the special game positions 30 visually to the player. Thus, the player is able to discern the special game positions 30 conveniently and without difficulty during game play and thus is able to be look out for special symbols appearing in the special game positions 30.

Figure 4:
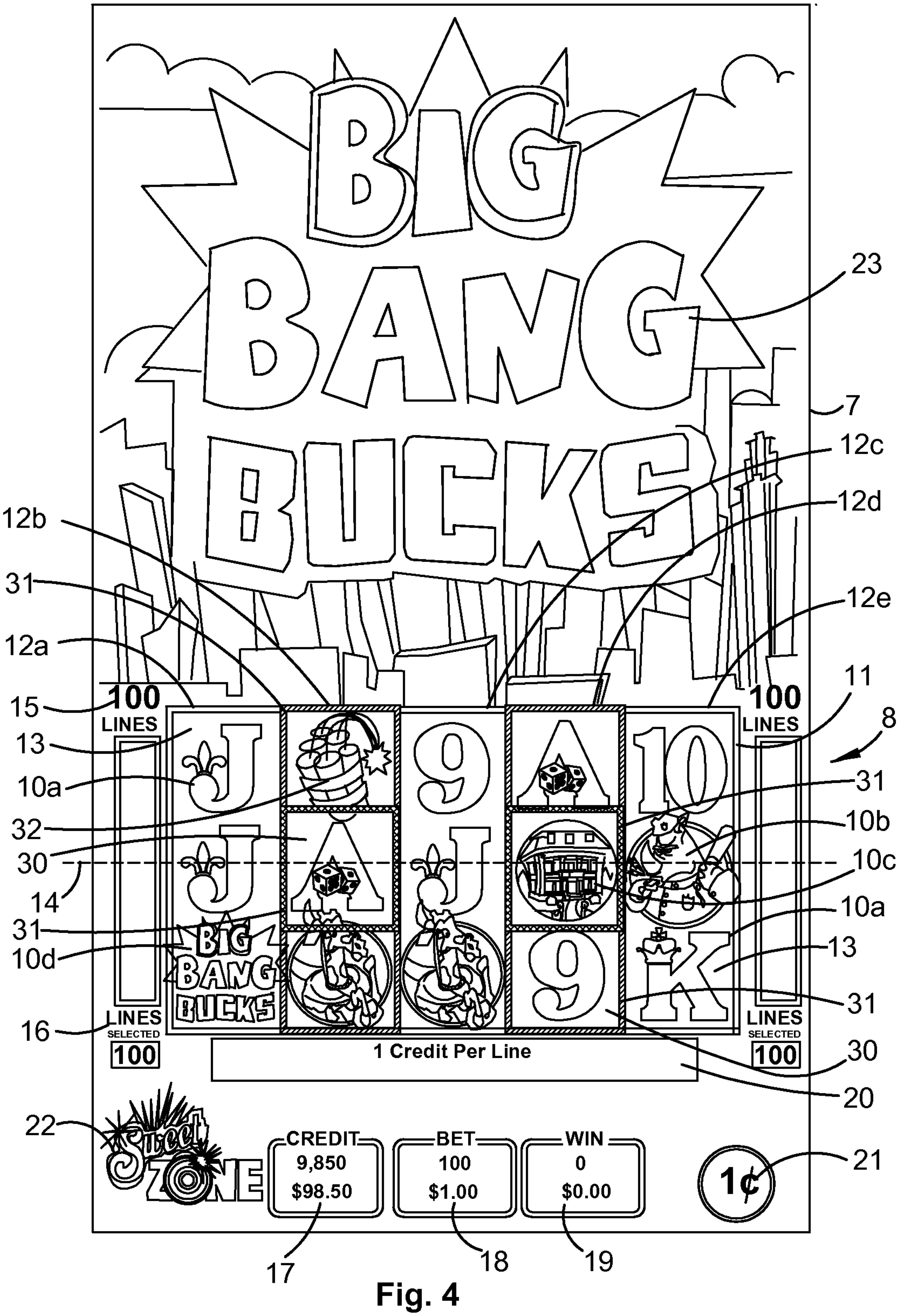
Figure 5:
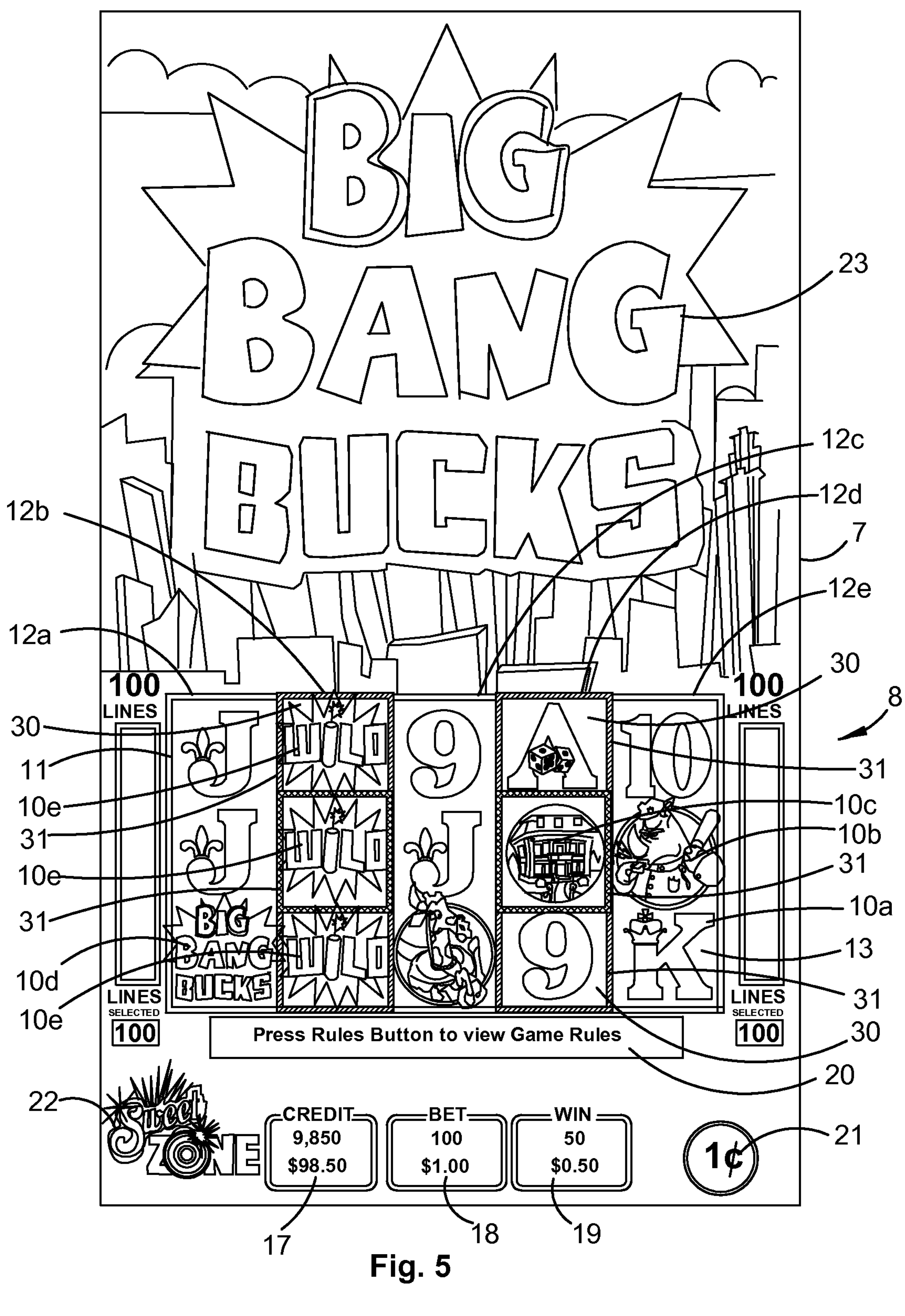

The electronic game controller 4 randomly displays game symbols 10 in the game positions 13 and the special game positions 30 as indicated by the boundary 31. Where a special symbol in the form of dynamite symbol 32 appears in one of the special game positions 30, this causes the electronic game controller 4 to award a game enhancing element to the player. In this embodiment, there are two game enhancing elements that are awarded, depending on whether the dynamite symbol 32 has appeared in a blue special game position 30 or a red special game position 30. If the dynamite symbol 32 appears in one of the blue game positions 30 (i.e. the top or bottom special game position 30 in either reel 12*b* or 12*d*), then the game enhancing element is a change or transformation of each of the game symbols 10 in all the special game positions 30 to another game symbol for the reel 12*b* in which the dynamite symbol 32 has appeared, as best shown in FIGS. 4 and 5. If the dynamite symbol 32 appears in one of the red game positions 30 (i.e. the middle special game position 30 in either reel 12*b* or 12*d*), then the game enhancing element is a selection of a group of "resultant" game positions 40 in which the game symbols 10 in those resultant game positions change or transform into another game symbol, as best shown in FIGS. 6 and 7. As best shown in FIG. 7, in this embodiment the resultant game positions 40 comprise all the special game positions 30 for the reel 12*b* in which the dynamite symbol 32 appeared and all the game positions 13 in the reels 12*a*, 12*c* on either side of the reel 12*b*. In either game enhancing element, the game symbol 10 in each special game position 30 or resultant game position 40 changes or transforms into the substitute WILD symbol 10*e*.

The player initially makes a bet using vending slots 5 initiate play of the electronic gaming machine 1 to build up credit to play the base game 8 on the electronic gaming machine. For example, the player can bet or wager monetary amounts equivalent to a particular amount of credits, depending on the bet denomination selected for the base game. Also, the player can make any additional side bets or ante-bets during play of the base game once the game has commenced to access additional features in the game, such as increasing the number of winning combinations in the game.

Typically, electronic gaming machines offer a number of preset bet options that the player can make, and these bet options can vary depending on the game or games offered on the electronic gaming machine. For example, a game on an electronic gaming machine may provide bet options of 1 credit, 2 credits, 5 credits and 10 credits per player-selected pay line 14. In another example, the player may bet 1 credit, 2 credits, 5 credits and 10 credits for a preset group or combination of pay lines 14, such as a group of 5 pay lines, 10 pay lines, 20 pay lines, etc.

Typically, the electronic gaming machine 1 has a default bet denomination, which is usually the bet denomination that was previously used in the preceding play of the base game 8. For example, if a person had played the base game 8 with a bet denomination of 5¢, then this would be the default bet denomination for the player when he or she commences play of the game. Where the electronic gaming machine has not yet been played or has been started up, the default bet denomination is initially selected by the electronic game controller 4. The default bet denomination can be randomly selected or chosen according to a predetermined order. Typically, the electronic game controller 4 will select the bet denomination with the lowest value that is available for the base game 8, which would be the 1¢ bet denomination for this embodiment. The player may change the bet denomination at any time in the base game 8 by touching the denomination button before or after the reels 12 have spun.

The electronic game controller 4 then commences a play of the base game 8 by causing the reels 12 to appear to visibly rotate or "spin" in a linear path, typically in a downward vertical direction, and randomly display the game symbols 10 in each game position 13 (including the special game positions 30) for each play of the array 11 for the base game 8. After the reels 12 stop spinning (and thus ends the spin or play of the base game 8), the electronic game controller 4 determines whether there are any predetermined winning combinations of the game symbols 10 appearing in any player-selected pay lines 14, such as a two of a kind, three of a kind, four of a kind or five of a kind for all the game symbols 10 and other combinations of a "full house", "straight" or "flush" for the playing card game symbols 10*a*. It will be appreciated that other winning combinations of game symbols 10 can also be provided. If so, the gaming machine 1 enters a winning game state and awards a prize according to the displayed predetermined winning combination.

The electronic game controller 4 will also determine whether the special dynamite symbol 32 has appeared in any of the special game positions 30. It is also noted that the special game positions 30 are visually indicated or marked by the boundaries 31 for the entire play from when the reels 12 start spinning to when the reels 12 stop spinning and display game symbols 10. If the dynamite symbol 32 appears in one of the other game positions 13, then this does not cause the award of either game enhancing element. As best shown in FIG. 4, the dynamite symbol 32 has appeared in the top blue special game position 30 of reel 12*b*, causing the electronic game controller 4 to award the game enhancing element. In this case, the game enhancing element comprises changing or transforming the game symbols 10 (including the dynamite symbol 32) in the resultant game positions 40 (being the special game positions 30 of reel 12*b*) into substitute WILD symbols 10*d*, as best shown in FIG. 5. This transformation of game symbols 10 into WILD symbols 10*d* increases the chances of the player obtaining a winning combination of game symbols for the player-selected pay lines 14.

Likewise, as best shown in FIG. 6, the dynamite symbol 32 has appeared in the middle red special game position 30 of reel 12*b*, causing the electronic game controller 4 to award the game enhancing element. In this case, the game enhancing element comprises changing or transforming the game symbols 10 (including the dynamite symbol 32) in the resultant game positions 40 (being the special game positions 30 of reel 12*b* and the game positions 13 of the adjoining reels 12*a*, 12*c* on either side of reel 12*b*) into substitute WILD symbols 10*d*, as best shown in FIG. 7. This transformation of game symbols 10 into WILD symbols 10*d* significantly increases the chances of the player obtaining a winning combination of game symbols for the player-selected pay lines 14.

The award of the game enhancing elements also occurs where the dynamite symbol 32 appears in either the blue or red special game positions 30 of the reel 12*d* with similar effect. However, the resultant game positions 40 are different for the special game positions 30 in the reel 12*d*. The dynamite symbol 32 in the top or bottom blue special game positions 30 of reel 12*d* will result in the game symbols 10 in the resultant game positions 40 (being the special game positions 30 of reel 12*d*) to change or transform into WILD symbols 10*e*. The dynamite symbol 32 in the middle red special game position 30 of reel 12*d* will result in the game symbols 10 in the resultant game positions 40 (being the special game positions 30 of reel 12*d* and game positions 13 of adjoining reels 12*c*, 12*e* on either side) to change or transform into WILD symbols 10*e*.

The electronic game controller 4 also determines whether the feature game 9 should be activated, based on a trigger event in the base game 8. In this embodiment, the trigger event is the appearance of three scatter symbols, being the BIG BANG BUCKS symbols 10*d*. The BIG BANG BUCKS symbols 10*d* need not appear on the same pay line 14, but can appear on any of the player-selected pay lines.

In response to the trigger event, the electronic game controller 4 causes the feature game 9 to appear on the video screen 7, as best shown in FIGS. 8 to 10 where corresponding features have been given the same reference numerals. In this embodiment, the feature game 9 comprises an array 50 of nine rows and five columns representing a 9×5 array that fills the entire video screen 7, as best shown in FIG. 8. The array 50 appears as an extension of the 5×3 base game array 11. In other words, when the feature game 9 is triggered, the additional rows rise up from the base game array 11 to create the feature game array 50. Alternatively, the feature game array 50 replaces the base game array 11.

The feature game 9 uses the same game symbols 10 as the base game 8, as well as the same array 11, reels 12, game positions 13 and player-selectable pay lines 14 on the video screen 7. In the feature game 9, ten free plays or spins of the feature game are awarded to the player without having to make an additional bet or wager. It will be understood by those skilled in the art that a free spin involves a play of the game without requiring any bet to be made by the player, and that any number of free spins can be chosen for the feature game 9. In addition, it will be appreciated that in the art free spins are commonly referred to as "free games". The number of free games remaining in the feature game 9 is indicated by a counter 51.

The feature game 9 operates in a similar manner to the base game 8, where the reels 12 visibly rotate and display randomly selected game symbols 10 in each game position 13, including the special game positions 30, as best shown in FIG. 8. The special game positions 30 are visually indicated or marked by their respective boundaries 31 from the start to the end of each play of the feature game 9, the same as in the base game 8. Predetermined winning combinations of randomly selected game symbols 10 in the array 50 of the feature game 9 also result in the award of prizes to the player, usually of an enhanced value compared to the prizes awarded in the base game 8.

The special game positions 30 in reels 12*b*, 12*d* do not change in the feature game array 50 in that they do not extend upward with the additional rows but remain the same as in the base game array 11. The special game positions 30, special dynamite symbols 32 and awarding of the game enhancing elements work in the substantially same manner in the feature game 9 as described in relation to the base game 8. In this case, the game enhancing elements are applied to all the game positions 13 in the extended reels 12*a* to 12*e*. For example, where a dynamite symbol 32 appears in the middle red game position 30 of the reel 12*b* (as best shown in FIG. 9), the electronic game controller 4 selects the group of resultant game positions 40 based on the same criteria of all the game positions in the reel 12*b* and all the game positions in the adjoining reels 12*a*, 12*c* on either side. This has the effect in the feature game 9 of selecting all the game positions 13 in each extended reel 12*a*, 12*b*, 12*c*, including the special game positions 30, as the resultant game positions 40 in which the game symbols 10 change into the substitute WILD symbol 10*e*, as best shown in FIG. 10.

In other preferred forms, the graphical element comprises an area on the array 11, 50 associated with each special game position 30 that changes to indicate the appearance of the dynamite special symbol 32 in the special game position. For example, message boxes (not shown) can appear adjacent the array 11, 50 and linked to the special game positions 30 that are initially blank and then advise the player when the dynamite special symbol 32 appears in the associated special game position 30. Also, there can be a common message box for all the special game positions 30 and the message advising the player which special game position has the dynamite special symbol 32.

In another preferred form, special game position 30 may be animated in other ways other than animating the boundary 31. For example, the special game position 30 could rotate about the dynamite special symbol 32. Alternatively, the boundary 31 can be animated differently to having a chaser light move along its perimeter. For example, the boundary 31 could be animated to show it is electrified to visually highlight and indicate its presence on the array 11, 50.

In yet another preferred form, the dynamite special symbol 32 is animated when it appears in the special game position 30 to visually indicate its appearance to the player. For example, the dynamite special symbol 32 may be static in game positions 13 but in the special game position 30, the fuse of the dynamite special symbol 32 may visually burn down to the dynamite and then explode to introduce the award of the game enhancing element.

While the embodiments of the invention have been described as using a change or transformation of game symbols into substitute symbols as the game enhancing elements, it will be appreciated that other game enhancing elements can be awarded instead or in conjunction with the transformation game enhancing element. For example, game enhancing symbols such as "Held Reels", "×10 Multiplier" (applicable to the prize awarded by the base game for the five of a kind trigger combination and/or to the total amount of the bet or credits bet per pay line), "10 Free Spins/Games", progressive symbols, fixed monetary prizes and changing the function of a standard game symbol 10*a*, 10*b*, 10*c* into a substitute symbol in addition to any displayed WILD substitute symbols 10*e*. Held columns or reels typically involve the column or reel to only display wild/substitute symbols, thus enhancing the probability of achieving a predetermined combination. Progressive symbols award a prize is awarded upon a certain number of progressive symbols are accumulated by the player over a number of games played on the gaming machine. Other examples include:

i) 15 Free Games;

ii) 10 Free Games;

iii) 8 Free Games;

iv) Bonus Prize of 5×bet (the total amount of the bet or credits bet per pay line);

v) Bonus Prize of 10×bet (the total amount of the bet or credits bet per pay line);

vi) Bonus Prize of 25×bet (the total amount of the bet or credits bet per pay line);

vii) Jackpot symbols for awarding monetary jackpots, including progressive jackpots, associated with the base game, feature game and/or the electronic gaming machine 1 independently of the game being played;

viii) All royal card symbols change to substitute symbols on reels 2, 3 and 4;

ix) All picture symbols 10*b* change to wilds on reels 2, 3 and 4, and x) All symbols change to wild symbols on reels 1 and 5.

These game enhancing symbols do not modify the function or value of the game symbols 10 that appear on the arrays 11, 50, but instead confer bonus prizes, free games or change existing game symbols for other game symbols (such as replacing picture, royal card or symbols belonging to a reel with wild/substitute symbols). Where the function of game symbols 10 have been changed or the game symbols 10 are replaced, then this modification can takes effect with the next play of the game instead of applying to the result of the spun array 11, 50. In another preferred form, the game enhancing symbols may indicate the duration in which its game enhancing element is applied, such as a predetermined number of spins or a predetermined time period.

In other preferred forms, the game enhancing element can be an enhanced version of the array 11, 50. The enhanced array may provide additional game enhancing symbols that include the award of points or an additional 5 free spins of the array 11, 50 (i.e. retriggering 5 more free spins). The collection of points awarded by the enhanced array during free spins or game leads to the trigger of additional prizes or game enhancing symbols, depending on the number of points that are collected. These additional prizes can include stand alone progressive jackpots, bonus prizes and super games, which are enhanced versions of free spins or games where there are greater pay outs or frequency of wins. In addition, the enhanced array has a different visual representation to the array 11, 50. In addition, the enhanced array may provide game enhancing symbols of greater value and/or frequency compared to the array 11, 50.

Where the game enhancing element comprises the award of a jackpot prize, it can take the form of a grand progressive jackpot confined to the electronic gaming machine 1. However, in another preferred form, the grand progressive jackpot is configured to be part of a wide area or in-house link progressive jackpot. In other words, the grand progressive jackpot can be awarded on a group of networked gaming machines in a specified area or a group of specified electronic gaming machines that are linked together for jackpot purposes.

Although the preferred embodiments of the invention have been described as awarding two types of game enhancing elements in both the base game 8 and the feature game 9, it will be appreciated that the special game positions 30 can be configured to award any number or types of game enhancing elements. For example, the special game positions 30 may only award only one game enhancing element. In another example, each special game position 30 awards its own unique game enhancing element to create an additional variety in game play. In a further example, the special game positions 30 may award one type of game enhancing element in the base game 8 and then award a different game enhancing element in the feature game 9.

In one preferred form, the resultant game positions 40 are limited to one of the reels adjacent or adjoining the reel containing the dynamite special symbol 32 in the special game position 30. The resultant game positions 40 can also exclude the reel containing the dynamite special symbol 32 in the special game position 30.

Also, while in the embodiment, the same special game position 30 awards the same group of resultant game positions 40 in the base game 8 and the feature game 9, in another variation, the resultant game positions 40 vary between the base game 8 and the feature game 9 for the same special game position 30.

Furthermore, the embodiments of the invention have been described as providing a standard 5×3 array for the base game 8 and an enlarged 9×5 array for the feature game 9. However, it will be appreciated that in other embodiments, the size and shape of the base game array 11 and feature game 50 may vary as desired. For example, the arrays 11, 50 could take any number of different shapes, such as triangular, circular, square, hexagonal, hemi-spherical or other polygonal shapes. For example, the base game array 11 could comprise a circular array having three rings (equivalent to rows) like a bullseye target segmented into five columns. The feature game array 50 would then expand into additional rings surrounding the initial rings of the base game array 11. Alternatively, the arrays 11, 50 could have an uneven number of rows or columns. For example, the reels 12*a*, 12*b* could have three rows, but the reels 12*c* to 12*e* could have four rows.

While the preferred embodiment of the invention has been described in relation to both a base game 8 and a feature game 9, those skilled in the art will appreciate that the use of special game positions 30, special symbols 32 and awarding game enhancing elements can readily be applied to the base game alone or a feature game alone.

In a further embodiment, the location of the special game positions 30 change between the base game 8 and the feature game 9. For example, the special game positions 30 can be located in reels 12*a* and 12*c* in the base game 8, and then move to reels 12*b* and 12*d* in the feature game 9. Also, the special game positions 30 may change between plays of the game (either the base game 8 or the feature game 9). This can be either successively or after a predetermined number of plays in one location, the special game position 30 moves to another location on the array 11, 50.

Another preferred form involves scattering the location of the special game positions 30 in the array 11, 50 instead of being grouped together in a particular reel 12. For example, instead of having special game positions 30 in reels 12*b*, 12*d*, the six special game positions 30 can be placed so that there is at least one special game position in each reel 12*a* to 12*e* of the array 11, 50. In yet another preferred form, additional special game positions 30 are provided in the feature game array 50. For example, another set of special game positions 30 can be located in reel 12*c* in addition to reels 12*b*, 12*d* in the feature game array 50.

In yet another preferred form, the boundaries 31 may only appear on their respective special game positions 30 once a play of the base game 8 commences and remain on display until the end of that play. Alternatively, the boundaries 31 are permanently displayed on their respective special game positions 30 at all times on the video screen 7.

Also, in a further preferred form, the player can selectively stop spinning of the reels 12, either individually or collectively, to increase player interaction and provide the player with an opportunity to guess when a dynamite special symbol 32 may appear in one of the special game positions 30. Furthermore, the player can start spinning of the reels 12 to further enhance player interaction.

In other preferred forms, the base game 8 and feature game 9 (and their corresponding arrays 11, 50) need not be displayed on a single video screen 7. Instead, they may be displayed on separate video screens, with the base game 8 and its array 11 appearing in a lower video screen and the feature game 9 and its array 50 appearing on both the lower video screen and an upper video screen.

In another preferred form, the video screen 7 is a touch screen for use in addition to the player-actuatable buttons 5 so as to enable the player to select various features, such as making monetary bets for the base game, initiating play of the base and feature games played on the arrays 11, 50 and responding to any messages or requests issued on the electronic gaming machine 1 by the electronic game controller 4. In this case, the player may control when the reels 12 start spinning and stop spinning by simply touching the reels 12.

In other preferred forms, the jackpot prize can be shared with any other games offered on the electronic gaming machine (as in multi-game gaming machines) or games offered on separate electronic gaming machines. In one preferred form, the jackpot prize comprises a mystery jackpot. That is, none of the symbols in the game trigger the jackpot; hence the triggering event is a “mystery”. By way of comparison, a standard jackpot is typically symbol driven in that a particular combination of symbols must occur in the game to trigger the standard jackpot.

It will be appreciated that while the preferred embodiments have been described in relation to an industry standard electronic gaming machine, the invention can be readily applied to other types of electronic gaming machines, including a personal computer (standing alone or connected to a communications network, LAN or WAN), mobile electronic devices (such as handheld or portable electronic devices like smart phones) and other electronic devices capable of displaying a game. In the case of a mobile electronic device, in one arrangement it may permit the player to make bets using "virtual" credits that represent a monetary value, but do not require the player to make a monetary transaction. Instead, the invention may provide a tiered access to the various features of the game so that the player can make relatively small payments to access particular features of the game or obtain additional benefits during game play. An alternative arrangement would require the player to purchase virtual credits or tokens via an interface on the mobile electronic device or an online interface accessible by the mobile electronic device. Similarly, either of the above described arrangements can be applied where the invention is implemented on a personal computer (PC) connected to the internet (wirelessly or not). In one example of the implementation, the PC would access an online casino over the internet to play the game of the invention or the game of the invention would be part of a social networking website. It is also contemplated that the player could also make regular payments to subscribe to continue playing the game on the mobile electronic device, PC or other electronic device.

In an alternative embodiment, the electronic gaming machine also provides an option for the player to play with either credits based on a monetary amount or virtual credits as discussed above. This can be implemented by way of a selection menu prior to playing the selected game or by providing a suitable menu button on screen during play of the selected game.

In another aspect, the invention includes a computer program configured to perform the invention. In this way the invention can be implemented in various ways on an electronic gaming machine. In a further aspect, the invention includes a gaming system configured comprising a central processing unit (such as a computer or computational processor) configured for communication with an electronic gaming machine to perform the invention. In a yet another aspect, the invention includes a non-transitory carrier medium carrying computer executable code that, when executed on a central processing unit configured for communication with an electronic gaming machine, causes said central processing unit to perform the invention. In this case, the non-transitory carrier medium includes an external hard drive, a memory device, including a memory card, smart card, a radio frequency identification (RFID) device, USB key, magnetic card or other electronic storage device.

It will further be appreciated that any of the features in the preferred embodiments of the invention can be combined together and are not necessarily applied in isolation from each other. For example, the feature of the player being able to selectively starting or stopping spinning of the reels 12 and the feature of scattering the location of the special game positions 30 can be combined into a single electronic gaming machine. Similar combinations of two or more features from the above described embodiments or preferred forms of the invention can be readily made by one skilled in the art.

By providing a special game position that can award game enhancing elements and which are visually indicated to the player during game play, the player's interest in the electronic gaming machine is increased as there is more chance of obtaining a winning combination, winning additional prizes or increasing the value of existing prizes. Thus, the invention retains the player interest and so the player is likely to continue playing the same electronic gaming machine. The player's anticipation and excitement is also heightened as he or she knows that a game enhancing element will be awarded upon the appearance of a special symbol in the special game position, and hence will pay more attention to the visually indicated special game position in the (base and/or feature) game. The invention also adds greater value to a player in terms of the probability of winning a prize and providing greater variety in game play, especially compared to a conventional electronic gaming machine that only has one set of reels and a single feature game. This value to the player is increased in the preferred embodiments of the invention by extending play of the special game position to the feature game in addition to the base game. All these advantages of the invention result in the player being more likely to retain interest in continuing to play the same electronic gaming machine due to the variation in game play on the electronic gaming machine. Furthermore, since the electronic game controller controls operation of the electronic gaming machine, the invention can be readily implemented to existing gaming machines and other gaming systems. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. An electronic gaming machine comprising:

a display for displaying a game, wherein said game comprises game symbols arranged into an array of predetermined game positions in columns and where predetermined winning combinations of randomly selected game symbols in said game award prizes to a player, vending slots for receiving monetary bets, and an electronic game controller adapted to determine if a bet has been made using the vending slots to initiate play of said game and to control the display of said game symbols on said display if a bet has been received, wherein said electronic game controller designates at least one of said predetermined game positions as a fixed special game position in said array, said game symbols being displayable in said special game position, wherein said special game position is visually indicated on said array to said player during each play of said game by a graphical element associated with said special game position, and wherein a special symbol appearing in said special game position in a play of said game causes said electronic game controller to designate a column including the special game position as resultant game positions such that the game symbols appearing in said resultant game positions change into at least one other game symbol.

2. The electronic gaming machine of claim 1, wherein said graphical element comprises a graphically enhanced element.

3. The electronic gaming machine of claim 1, wherein said graphical element comprises a highlighted boundary of said special game position.

4. The electronic gaming machine of claim 1, wherein said graphical element comprises an animation associated with said special game position.

5. The electronic gaming machine of claim 4, wherein said animation comprises an animation of said special game position.

6. The electronic gaming machine of claim 1, wherein said graphical element comprises an animation of said special symbol appearing in said special game position.

7. The electronic gaming machine of claim 1, wherein said graphical element is displayed on said display at all times on said electronic gaming machine.

8. The electronic gaming machine of claim 1, wherein said graphical element is displayed from the start of a play of said game until the end of said play.

9. The electronic gaming machine of claim 1, wherein said graphical element comprises an area within said array associated with said special game position.

10. The electronic gaming machine of claim 9, wherein said associated area changes in response to said special symbol appearing in said special game position.

11. The electronic gaming machine of claim 1, wherein said electronic game controller designates at least one additional predetermined game position as a second fixed special game position in said array, said game symbols being displayable in said second special game position, wherein said second special game position is visually indicated on said array to said player different from the special game position during each play of said game by a graphical element associated with said second special game position, and wherein a special symbol appearing in said second special game position in a play of said game cause said electronic game controller to designate a column including the second special game position and adjacent columns to the left and the right of the column as resultant game positions such that game symbols appearing in said resultant game positions change into at least one other game symbol.

12. The electronic gaming machine of claim 11, wherein said game symbols in said resultant game positions change into a substitute symbol.

13. The electronic gaming machine of claim 1, wherein there is a plurality of said special game positions on said array.

14. The electronic gaming machine of claim 11, wherein said array comprises rows and columns of predetermined game positions and at least one of said columns comprises only said special and said second special game positions.

15. The electronic gaming machine of claim 1, wherein the game comprises a base game and a feature game.

16. The electronic gaming machine of claim 15, wherein said special game position is available for play in only said base game, only said feature game or both said base game and said feature game.

17. An electronic gaming machine comprising:

a display for displaying a game, wherein said game comprises game symbols arranged into an array of predetermined game positions and where predetermined winning combinations of randomly selected game symbols in said game award prizes to a player and said game comprises a base game and a feature game, vending slots for receiving monetary bets, and an electronic game controller adapted to determine if a bet has been made using the vending slots to initiate play of said game and to control the display of said game symbols on said display if a bet has been received, wherein said electronic game controller designates at least one of said predetermined game positions as a special game position in said array, said game symbols being displayable in said special game position, wherein said special game position is visually indicated on said array to said player during each play of said game by a graphical element associated with said special game position, wherein a special symbol appearing in said special game position in a play of said game causes said electronic game controller to award a game enhancing element to said player, wherein said base game and said feature game each comprises an array of rows and columns of said predetermined game positions, and said base game array is different in size and/or dimensions to said feature game array.

18. The electronic gaming machine of claim 17, wherein said feature game array is greater in size than said base game array.

19. The electronic gaming machine of claim 18, wherein said base game array comprises three rows and five columns and said feature game array comprises either more than three rows or more than five columns.

20. The electronic gaming machine of claim 17, wherein said electronic game controller designates a different predetermined game position as said special game position between a play of said base game and a play of said feature game.

21. A gaming method for an electronic gaming machine comprising a display, vending slots to receive monetary bets, and an electronic game controller, comprising:

determining if a bet has been made using the vending slots to initiate play of the game;

if a bet has been made, controllably displaying game symbols on said display to play a game wherein predetermined winning combinations of randomly selected game symbols in said game award prizes to a player;

arranging said game symbols into an array of predetermined game positions in columns;

designating at least one of said predetermined game positions as a fixed special game position in said array, wherein said game symbols are displayable in said special game position;

associating a graphical element with each said special game position to visually indicate each said special game position to said player during each play of said game, and designate a column including the special game position as resultant game positions such that the game symbols appearing in said resultant game positions change into at least one other game symbol in response to the appearance of a special symbol in said special game position in a play of said game.

22. The gaming method of claim 21, wherein said associating step comprises graphically enhancing the visual appearance of said special game position.

23. The gaming method of claim 21, wherein said associating step comprises highlighting a boundary of said special game position.

24. The gaming method of claim 21, wherein said associating step comprises associating an animation with said special game position.

25. The gaming method of claim 24, further comprising animating said special game position.

26. The gaming method of claim 21, wherein said associating step comprises animating said special symbol appearing in said special game position.

27. The gaming method of claim 21, wherein said associating step comprises changing an area within said array associated with said special game position in response to said special symbol appearing in said special game position.

28. The gaming method of claim 21, further comprising:

designating at least one additional predetermined game position as a second fixed special game position in said array, wherein said game symbols are displayable in said second special game position, associating a graphical element with each said second special game position to visually indicate each said special game position to said player different from the special game position during each play of said game, and designating a column including the second special game position and adjacent columns to the left and the right of the column as resultant game positions and changing game symbols appearing in said resultant game positions into at least one other game symbol in response to the appearance of a special symbol in said second special game position in a play of said game.

29. The gaming method of claim 28, wherein said game symbols change into a substitute symbol.

30. The gaming method of claim 21, further comprising providing a plurality of said special positions.

31. The gaming method of claim 21, wherein said designating step comprises designating said special game position in only a base game, only a feature game or both said base game and said feature game.

32. A gaming method for an electronic gaming machine comprising a display, vending slots to receive monetary bets, and an electronic game controller, comprising:

determining if a bet has been made using the vending slots to initiate play of the game;

if a bet has been made, controllably displaying game symbols on said display to play a game wherein predetermined winning combinations of randomly selected game symbols in said game award prizes to a player;

arranging said game symbols into an array of predetermined game positions;

designating at least one of said predetermined game positions as a special game position in said array, wherein said game symbols are displayable in said special game position, wherein said designating step comprises designating said special game position in only a base game, only a feature game or both said base game and said feature game;

associating a graphical element with each said special game position to visually indicate each said special game position to said player during each play of said game, and awarding a game enhancing element in response to the appearance of a special symbol in said special game position in a play of said game wherein said base game and said feature game each comprises an array of rows and columns of said predetermined game positions, further comprising displaying said base game array in a different size and/or dimensions to said feature game array.

33. The gaming method of claim 32, wherein said feature game array is greater in size than said base game array.

34. The gaming method of claim 33, wherein said base game array comprises three rows and five columns and said feature game array comprises either more than three rows or more than five columns.

35. The gaming method of claim 33, wherein said designating step comprises designating a different predetermined game position as said special game position between a play of said base game and a play of said feature game.

* * * * *